(No Model.) 3 Sheets—Sheet 2.

J. H. GRIMM & W. G. PENNYPACKER.
APPARATUS FOR REBURNING ANIMAL CHARCOAL.

No. 447,313. Patented Mar. 3, 1891.

WITNESSES:
INVENTORS:

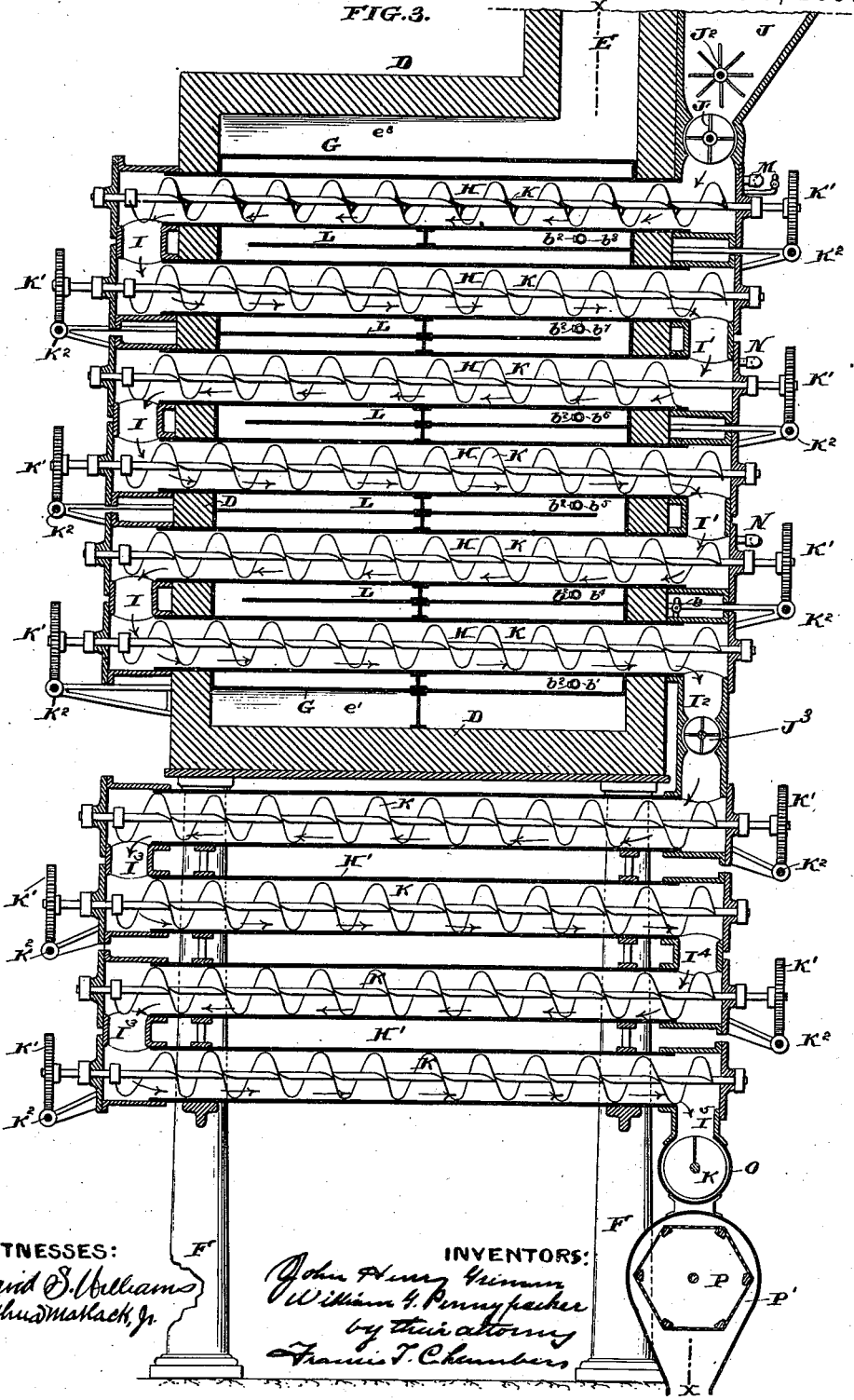

United States Patent Office.

JOHN HENRY GRIMM AND WILLIAM G. PENNYPACKER, OF WILMINGTON, DELAWARE.

APPARATUS FOR REBURNING ANIMAL CHARCOAL.

SPECIFICATION forming part of Letters Patent No. 447,313, dated March 3, 1891.

Application filed November 27, 1889. Serial No. 331,754. (No model.)

*To all whom it may concern:*

Be it known that we, JOHN HENRY GRIMM and WILLIAM G. PENNYPACKER, both of Wilmington, county of New Castle, State of Delaware, have invented a new and useful Apparatus for Reburning Animal Charcoal, of which the following is a true and exact description, reference being had to the accompanying drawings, which form a part of this specification.

Our invention relates to the construction of apparatus for reburning animal charcoal after it has been used in the manufacture of sugar or analogous uses; and our object is to provide means for accomplishing this reburning and for restoring the spent "char," as it is called, to a condition fit for further use in an efficient and satisfactory manner.

Our invention will be best understood after a description of the drawings, in which it is illustrated, and the novel features we desire to protect are hereinafter clearly stated in the claims.

Figure 1:
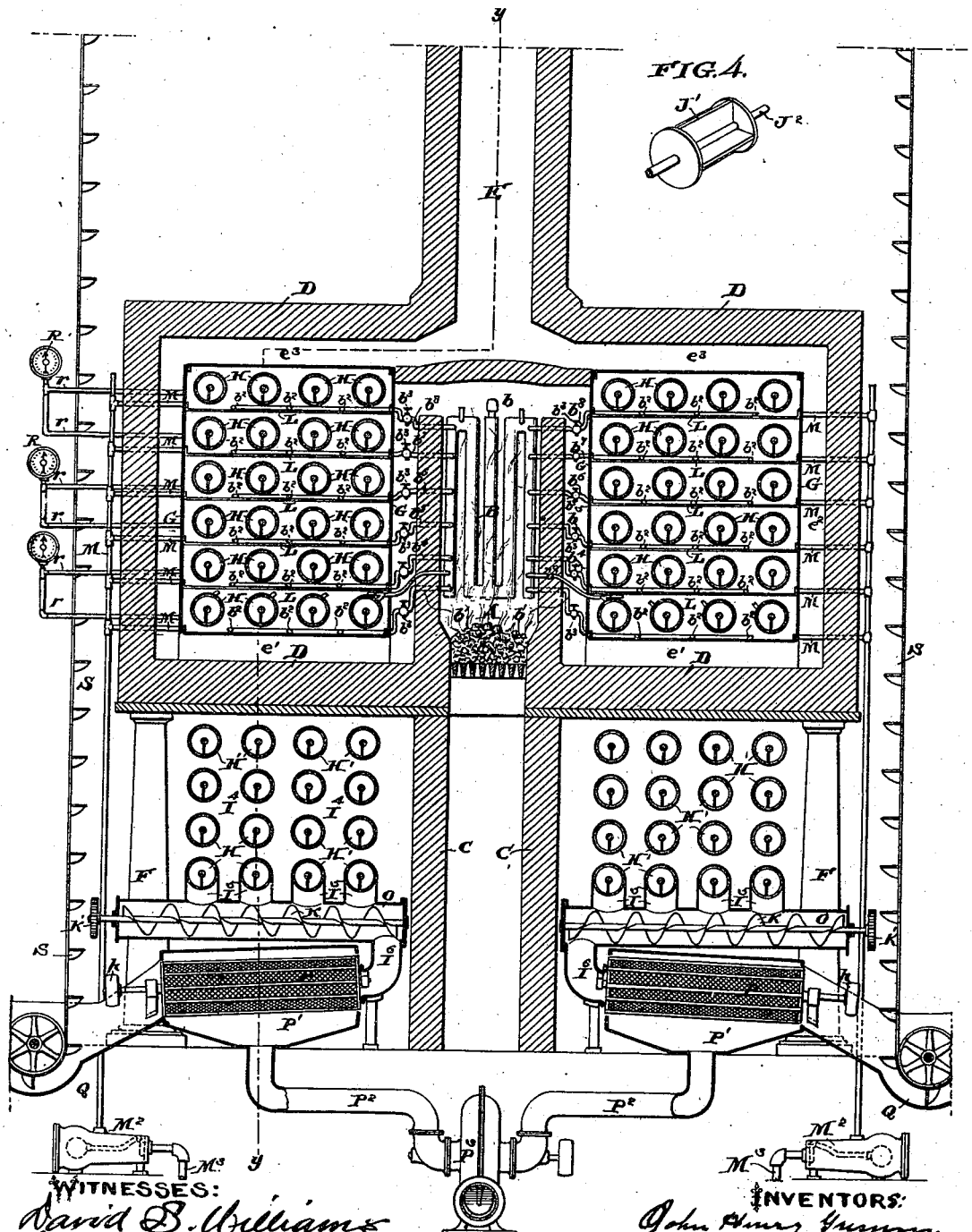
Figure 2:
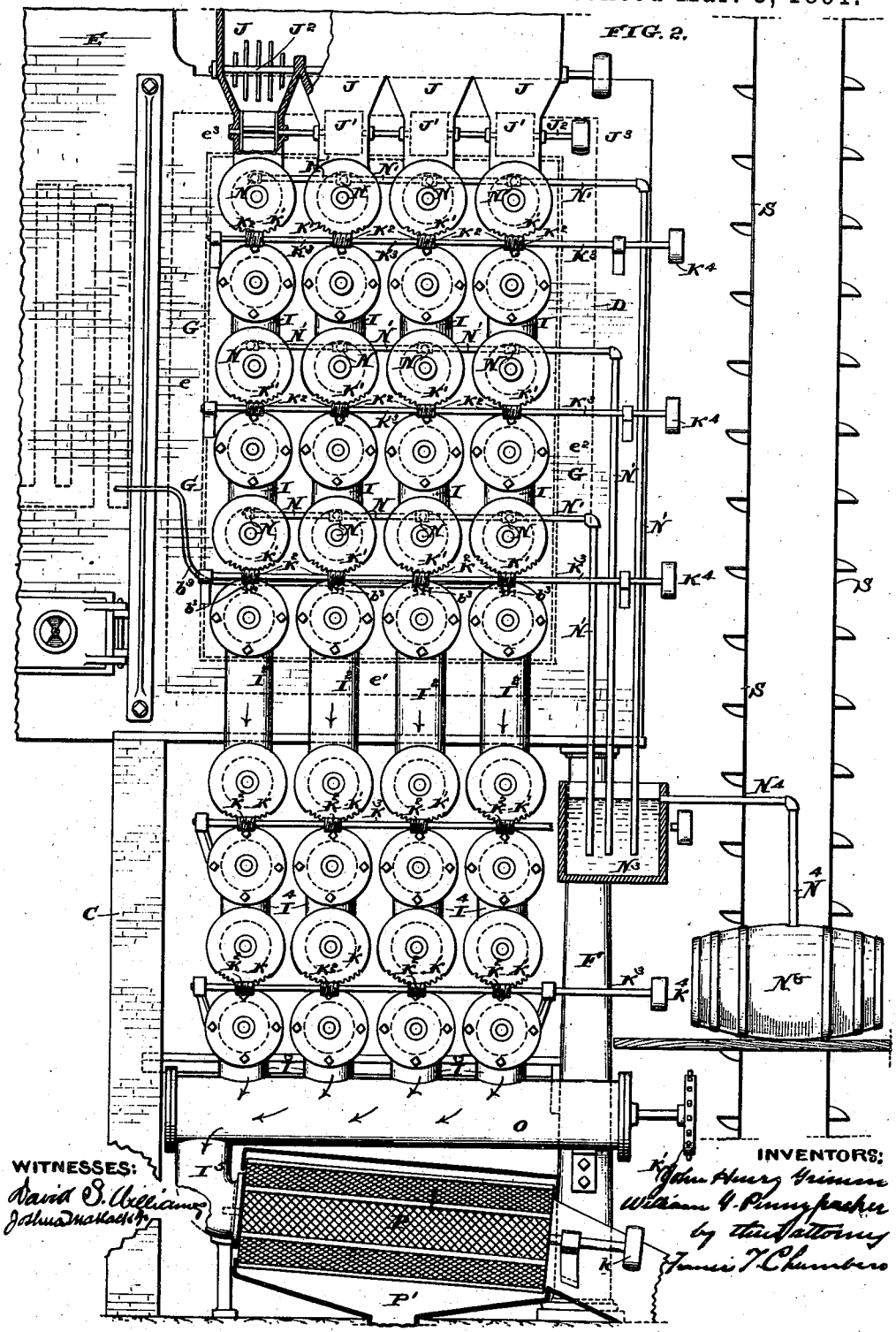

In the drawings, Figure 1 is a front sectional elevation of our apparatus, the section being indicated by line $x\,x$, Fig. 3. Fig. 2 is a front elevation of one side of the apparatus on a larger scale than Fig. 1, portions only being here shown in section. Fig. 3 is a cross-sectional elevation on the line $y\,y$ of Fig. 1 and on the scale of Fig. 2, and Fig. 4 is a perspective view of the feed-valve.

A is a furnace supported on walls C C and containing a steam-superheating coil B, one end $b$ of which connects to a steam-boiler. (Not shown.)

G G are retort-chambers, preferably made of iron and built into and supported by walls D of masonry, a flue $e\,e'\,e^2\,e^3$ leading from furnace A around chamber G to stack E.

F F are pillars supporting chambers G and the masonry surrounding them.

H H, &c., are retorts placed in the chambers G, as shown, and connected together in a superimposed series by passages I I', so as to form a zigzag passage.

J is a feed-hopper leading into the upper retorts of the series; J', a feed-regulating device or valve arranged to feed a regulated quantity of char to the retorts and to close the opening into the upper retort, and $J^2$ a stirrer.

K K, &c., are conveyers situated in the retorts and acting to feed the char along them and from one to the other continuously. As shown, the conveyers have worm-wheels K' attached to the projecting ends of their shafts and engaging worms $K^2$ on shafts $K^3$, which shafts are driven by pulleys $K^4$; but of course any convenient mechanism may be used to drive the conveyers.

$I^2$ is a passage leading from the lowest of each series of connected retorts to the cooling system hereinafter described. A valve J' is preferably situated in this passage to feed the char down and close the passage $I^2$ against the passage of air or hot gas in either direction. The retort chamber or chambers G are heated by steam introduced from the superheater B, as by pipes $b'\,b^4\,b^5$, &c., the said pipes having preferably several openings $b^2$ in the chamber. These conduits should all have valves $b^3$, so as to permit the operator to regulate the amount of steam introduced at each level.

We provide pyrometers R, connecting with the retort-chamber G at various levels, as by pipes $r$, so that the operator can ascertain the heat to which the various retorts of each system are exposed and regulate the steam accordingly. If desired, steam may be admitted to the retort-chamber G only at its bottom; but we prefer the arrangement for admitting steam at various levels, as shown. It is sometimes desirable to admit superheated steam to the inside of the retort system in order to facilitate the purification or recarbonization of the spent char, and for that purpose we provide a pipe $b^9$, leading from the superheater into the lower retorts H, valves $b^3$ being of course arranged in it, so as to control the admission of steam.

In the retort-chamber G we prefer to arrange a system of partitions L L, &c., as is shown in the drawings, these partitions being placed between the superimposed retorts and arranged to divide the chamber into a zigzag passage, so that the steam will be compelled to pass along each retort before it rises to the space between partitions inclosing the next highest retort. In this way the retort on the level of which the steam is admitted is first thoroughly heated before the steam passes to the one above, and we will here note that our intention is to have the heat greatest at the bottom of the retort system and gradually decreasing toward its top, and our apparatus is especially designed with a view to this mode of use.

M M, &c., are drain-pipes leading from retort-chamber G, (preferably from the level of each partition, as shown,) by which the water of condensation is led away. One or more steam-traps are employed to prevent the escape of steam. As shown, pipes M lead into a pipe M', at the bottom of which a steam-trap M² is situated, and from which trap leads the drain-pipe M³.

N N, &c., are vent-pipes leading from the inside of the retorts H for the purpose of permitting the escape of all gases or vapors generated from the char under treatment. These vents should have or be connected with a seal to prevent the entrance of air. As shown, the vents N connect with pipes N', which lead to a water-seal N³, and this seal has an overflow-pipe N⁴, leading to a storage-receptacle N⁵, which stores the condensed vapors arising from the char in case it is desired to utilize them.

Below the retort-chambers and connected with the retorts by passages I² are a system or systems of cooling-tubes, which we prefer to construct, as shown, of a number of substantially horizontal tubes H' H', &c., connected, like the retort-tubes H, by passages I³ I⁴ and provided with conveyers K, actuated, like the retort-conveyers, to feed the char from one to the other. These cooling-tubes are exposed to the air, so as to facilitate the cooling down of the char, and their joint length in each system, together with the speed of the conveyers, is such as to effect the cooling of the char to the necessary degree by the time it has passed through them. A passage I⁵ leads from each system of cooling-tubes to a tube O, in which a conveyer K works to feed the char through passage I⁶ to a bolting-reel P, which forms a part of the conduit, through which the char passes to the receptacle Q.

S is an elevator for conveying the char to the place of storage or use. The reel P is rotated in any convenient way, as by a pulley $p$, and is situated in a chamber P', which receives the fine char which passes through it. To facilitate the drawing out of fine char, we employ an exhaust-fan P³, connecting with chamber P' by conduit P².

Our apparatus is conveniently made double, as shown in Fig. 1; but the sides being alike we have only described it with reference to one.

The operation of the device is as follows: The fuel in the furnace being ignited, steam is admitted to the superheater B, and from it passes through one or more of the conduits $b'$ $b^4$ $b^5$, &c., to the retort-chamber G, and its contained retorts are heated by it, the chamber also receiving heat from the flue $e\ e'\ e^2\ e^3$, leading around it from the furnace A to stack E. The water of condensation from the steam in chamber G passes out through drain-pipes M. When the retorts are heated to the desired degree, which can be ascertained by the pyrometers R, the spent char in hoppers J is fed into the upper retorts of the system by the feed-regulating devices or valves J', which serve not only to regulate the feed, but also to seal the opening in which they are situated against the escape of gas or entrance of air. As we do not permit pressure to accumulate in the retorts, this does not require a very tight sealing device. The conveyers K are at the same time set in operation, and the char is conveyed continuously along through each retort to its open end, where it falls into the next one below, until it finally passes out through passage I², by this time being thoroughly reburned and recarbonized, this result being facilitated by the admission of steam in small regulated quantity through pipes $b^6$. The vapors driven off from the char in retorts H escape through vents N. To prevent the hot gases from the retorts or any air or gas from below passing through passage I² with the char, we prefer to use the feed-regulating valve J³ in this passage, which leads into the upper tube of a system of connected cooling-tubes H', through which the char is conveyed to the reel P and conveyer S, as already noted.

The notable advantages of our apparatus are that the heat of the retorts is under perfect control. The action of the retorts and conveyers is such that every particle of the char is similarly treated and equally well recarbonized. Vitrification of the char is impossible. The treatment is continuous.

It will be obvious that our retort-chamber can be heated by other means than superheated steam, though we prefer it as giving a better control of the temperature and as being less likely to injure the retorts than where the heating is accomplished by the combustion of gas or vapor.

Having now described our invention, what we claim as new, and desire to secure by Letters Patent, is—

1. In a device for reburning animal charcoal, a retort-chamber, in combination with one or more series of connective retorts situated one above another therein, conveyers working in the retorts, substantially as described, so as to convey the char gradually through the retort system, a series of ports arranged at varying heights in the retort-chamber for the supply of steam or gas used in heating it, and valves governing said ports.

2. In a device for reburning animal charcoal, a furnace A, in combination with a retort-chamber G, a steam-superheater situated in the furnace, one or more conduits connecting the superheater with the retort-chamber, one or more series of connected retorts H, situated one above the other in the retort-chamber, a conduit leading from the superheater to the system of retorts and having a controlling-valve, conveyers working inside the retorts, a feed-hopper leading into the upper retort of the system, and a discharge-passage leading from the lower retort.

3. In a device for reburning animal charcoal, a furnace A, in combination with a retort-chamber G, a steam-superheater situated in the furnace, conduits connecting the superheater with the inside of the retort-chamber, one or more series of connected retorts H, situated one above the other in the retort-chamber, a series of partitions L, placed in the retort-chamber between the superimposed retorts, so as to divide it into a zigzag passage, a feeding-hopper J, connected with the upper retort or retorts, a passage $I^2$, leading from the lower retorts, and conveyers K, situated in the retorts.

4. In a device for reburning animal charcoal, a furnace A, in combination with a retort-chamber G, a steam-superheater situated in the furnace, conduits connecting the superheater with the inside of the retort-chamber, one or more series of connected retorts H, situated one above the other in the retort-chamber, a series of partitions L, placed in the retort-chamber between the superimposed retorts, so as to divide it into a zigzag passage, two or more pyrometers R, connected with the retort-chamber at different levels, a feeding-hopper J, connected with the upper retort or retorts, a passage $I^2$, leading from the lower retorts, and conveyers K, situated in the retorts.

5. In a device for reburning animal charcoal, a furnace A, in combination with a retort-chamber G, a steam-superheater situated in the furnace, conduits connecting the superheater with the inside of the retort-chamber, one or more series of connected retorts H, situated one above the other in the retort-chamber, a series of partitions L, placed in the retort-chamber between the superimposed retorts, so as to divide it into a zigzag passage, a feeding-hopper J, connected with the upper retort or retorts, a passage $I^2$, leading from the lower retorts, one or more series of connected cooling-tubes H', connected with the retorts H by passage $I^2$, and conveyers K, situated in the retorts and cooling-tubes and arranged to feed the char through them.

6. In a device for reburning animal charcoal, a furnace A, in combination with a retort-chamber G, a steam-superheater situated in the furnace, conduits connecting the superheater with the inside of the retort-chamber, one or more series of connected retorts H, situated one above the other in the retort-chamber, a series of partitions L, placed in the retort-chamber between the superimposed retorts, so as to divide it into a zigzag passage, a feeding-hopper J, connected with the upper retort or retorts, a passage $I^2$, leading from the lower retorts, a feeding-valve $J^3$, situated in passage $I^2$, one or more series of connected cooling-tubes H', connected with the retorts H by passage $I^2$, and conveyers K, situated in the retorts and cooling-tubes and arranged to feed the char through them.

7. In a device for reburning animal charcoal, a furnace A, in combination with a retort-chamber G, a steam-superheater situated in the furnace, conduits $b'$ $b^4$ $b^5$, &c., connecting the superheater with the inside of the retort-chamber at different levels and having regulating-valves $b^3$, one or more series of connected retorts H, situated one above the other in the retort-chamber, a series of partitions L, placed in the retort-chamber between the superimposed retorts, so as to divide it into a zigzag passage, a feeding-hopper J, connected with the upper retort or retorts, a passage $I^2$, leading from the lower retorts, and conveyers K, situated in the retorts.

8. In a device for reburning animal charcoal, a furnace A, in combination with a retort-chamber G, a steam-superheater situated in the furnace, conduits $b'$ $b^4$ $b^5$, &c., connecting the superheater with the inside of the retort-chamber at different levels and having regulating-valves $b^3$, one or more series of connected retorts H, situated one above the other in the retort-chamber, vent-pipes N, leading from the retorts, a series of partitions L, placed in the retort-chamber between the superimposed retorts, so as to divide it into a zigzag passage, a feeding-hopper J, connected with the upper retort or retorts, a passage $I^2$, leading from the lower retorts, and conveyers K, situated in the retorts.

9. In a device for reburning animal charcoal, a furnace A, in combination with a retort-chamber G, a flue leading from the furnace around the retort-chamber, a steam-superheater situated in the furnace, conduits connecting the superheater with the inside of the retort-chamber, one or more series of connected retorts H, situated one above the other in the retort-chamber, a series of partitions L, placed in the retort-chamber between the superimposed retorts, so as to divide it into a zigzag passage, a feeding-hopper J, connected with the upper retort or retorts, a passage $I^2$, leading from the lower retorts, and conveyers K, situated in the retorts.

10. In a device for reburning animal charcoal, a furnace A, in combination with a retort-chamber G, a steam-superheater connected with the retort-chamber by conduits $b'$ $b^4$ $b^5$, &c., a series of connected retorts H, situated in the chamber, a feed-hopper J, leading into the upper retort, a feed-regulating valve to govern the amount of char delivered to the retorts, conveyers K, working in the retorts, and a passage $I^2$, leading from the lower retort of the series outside of the chamber G.

11. In a device for reburning animal charcoal, a furnace A, in combination with a retort-chamber G, a steam-superheater connected with the retort-chamber by conduits $b'$ $b^4 b^5$, &c., a series of connected retorts H, situated in the chamber, a feed-hopper J, leading into the upper retort, a feed-regulating valve to govern the amount of char delivered to the retorts, conveyers K, working in the retorts, a passage $I^2$, leading from the lower retort of the series outside of the chamber G, and a regulating-valve $J^3$, situated in passage $I^2$.

12. In a device for reburning animal charcoal, the retort-chamber G, in combination with the connected retorts H, the connected cooling-tubes H′, conveyers K, working in the retorts and tubes, a bolting-reel P, connected with the delivery end of the cooling-tubes, a reel-chamber P′, and an exhaust $P^3$, acting to draw fine char through the reel P and from chamber P′.

J. HENRY GRIMM.
WM. G. PENNYPACKER.

Witnesses:
MICHAEL DUGAN,
FRANK E. SMITH.